US008332641B2

(12) United States Patent
Case et al.

(10) Patent No.: US 8,332,641 B2
(45) Date of Patent: Dec. 11, 2012

(54) AUTHENTICATED DEBUG ACCESS FOR FIELD RETURNS

(75) Inventors: Lawrence L. Case, Austin, TX (US); Asaf Ashkenazi, Austin, TX (US); Ruchir Chhabra, Austin, TX (US); Carlin R. Covey, Tempe, AZ (US); David H. Hartley, Seacombe Heights (AU); Troy E. Mackie, Austin, TX (US); Alistair N. Muir, Austin, TX (US); Mark D. Redman, Gilbert, AZ (US); Thomas E. Tkacik, Phoenix, AZ (US); John J. Vaglica, Austin, TX (US); Rodney D. Ziolkowski, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 963 days.

(21) Appl. No.: 12/363,259

(22) Filed: Jan. 30, 2009

(65) Prior Publication Data

US 2010/0199077 A1 Aug. 5, 2010

(51) Int. Cl.
 *G06F 9/00* (2006.01)
(52) U.S. Cl. ............. 713/168; 713/182; 713/185; 726/2
(58) Field of Classification Search .................... 713/168
 See application file for complete search history.

(56) References Cited

U.S. PATENT DOCUMENTS

| 5,621,912 A * | 4/1997 | Borruso et al. .................... 718/1 |
| 5,704,039 A | 12/1997 | Yhishay |
| 5,961,641 A * | 10/1999 | Hasegawa et al. ................. 713/1 |
| 5,978,902 A * | 11/1999 | Mann ............................. 712/227 |
| 6,026,503 A * | 2/2000 | Gutgold et al. .................. 714/45 |
| 6,968,420 B1 * | 11/2005 | Giles et al. ..................... 711/103 |
| 7,103,782 B1 | 9/2006 | Tugenberg et al. |
| 7,248,069 B2 | 7/2007 | Moyer et al. |
| 7,539,966 B2 * | 5/2009 | Basu et al. ..................... 716/119 |
| 7,657,791 B2 * | 2/2010 | Codrescu et al. ............... 714/30 |
| 7,886,150 B2 * | 2/2011 | Stollon et al. ................. 713/171 |
| 7,941,862 B2 * | 5/2011 | Ma et al. ......................... 726/28 |

(Continued)

FOREIGN PATENT DOCUMENTS

WO 03081400 A2 10/2003

(Continued)

OTHER PUBLICATIONS

PCT Application No. PCT/US2010/020855; Search Report and Written Opinion dated Jul. 28, 2010.

*Primary Examiner* — Kambiz Zand
*Assistant Examiner* — Yonas Bayou

(57) ABSTRACT

Under the direction of a first party, an integrated circuit (IC) device is configured to temporarily enable access to a debug interface of the IC device via authentication of the first party by a challenge/response process using a key of the IC device and a challenge value generated at the IC device. The first party then may conduct a software evaluation of the IC device via the debug interface. In response to failing to identify an issue with the IC device from the software evaluation, the first party can permanently enable open access to the debug interface while authenticated and provide the IC device to a second party. Under the direction of the second party, a hardware evaluation of the IC device is conducted via the debug interface that was permanently opened by the first party.

16 Claims, 5 Drawing Sheets

U.S. PATENT DOCUMENTS

| | | | |
|---|---|---|---|
| 8,065,512 B2 * | 11/2011 | Khan et al. | 713/2 |
| 2001/0015654 A1 | 8/2001 | Habersetzer | |
| 2002/0018380 A1 | 2/2002 | Shinmori | |
| 2002/0166061 A1 | 11/2002 | Falik et al. | |
| 2002/0174342 A1 | 11/2002 | Freeman et al. | |
| 2003/0005335 A1 | 1/2003 | Watanabe | |
| 2003/0014653 A1 | 1/2003 | Moller et al. | |
| 2003/0140205 A1 | 7/2003 | Dahan et al. | |
| 2003/0140245 A1 | 7/2003 | Dahan et al. | |
| 2004/0006713 A1 * | 1/2004 | Minemura | 713/201 |
| 2004/0123118 A1 | 6/2004 | Dahan et al. | |
| 2004/0210805 A1 | 10/2004 | Kimelman et al. | |
| 2005/0193220 A1 * | 9/2005 | Little et al. | 713/201 |
| 2006/0031685 A1 | 2/2006 | Chen et al. | |
| 2006/0282734 A1 | 12/2006 | Milne et al. | |
| 2007/0162759 A1 * | 7/2007 | Buskey et al. | 713/182 |

FOREIGN PATENT DOCUMENTS

| | | |
|---|---|---|
| WO | 2006000943 A2 | 1/2006 |
| WO | 2006053586 A1 | 5/2006 |

* cited by examiner

_US 8,332,641 B2_

AUTHENTICATED DEBUG ACCESS FOR FIELD RETURNS

FIELD OF THE DISCLOSURE

The present disclosure relates generally to integrated circuit (IC) devices and more particularly to debug interfaces in IC devices.

BACKGROUND

Integrated circuit (IC) devices often are configurable by a downstream vendor or other customer to store sensitive information, such as an encryption/decryption key, a serial number, and the like. However, debug interfaces in such IC devices often pose a security risk in that they can be manipulated to gain unauthorized access to the secure information. Accordingly, customers often request that IC manufacturers provide some mechanism that allows the customer to disable access to the debug interface. Often, this is accomplished by blowing a fuse associated with the debug interface so as to disable access via the debug interface.

When an IC device is determined to be potentially defective, it often is advantageous to return it to the manufacturer for hardware evaluation (i.e., a "field return"). However, as the customer typically has disabled access to the debug interface, the manufacturer conventionally must resort to complex and expensive techniques to regain access to the debug interface for hardware evaluation. Typically, access to the debug interface is regained by using focused ion beam (FIB) modification to blow a counterpart fuse in the IC device to regain access to the debug interface. FIB modification, however, poses a number of problems. For one, FIB modification requires the use of expensive and complicated equipment and often is unsuccessful regardless. For another, FIB modification often requires destructive deencapsulation of the IC device and thus can prevent future evaluation. FIB modification also results in an override of the customer configuration, thereby preventing subsequent access to such configuration information for further analysis. FIB modification also is relatively temporary due to metal migration, which at some point reconnects the blown counterpart fuse and returns the IC device to a state whereby the debug interface is inaccessible. Accordingly, an improved technique to gain access to the debug interface of a previously-secured IC device for hardware evaluation would be advantageous.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
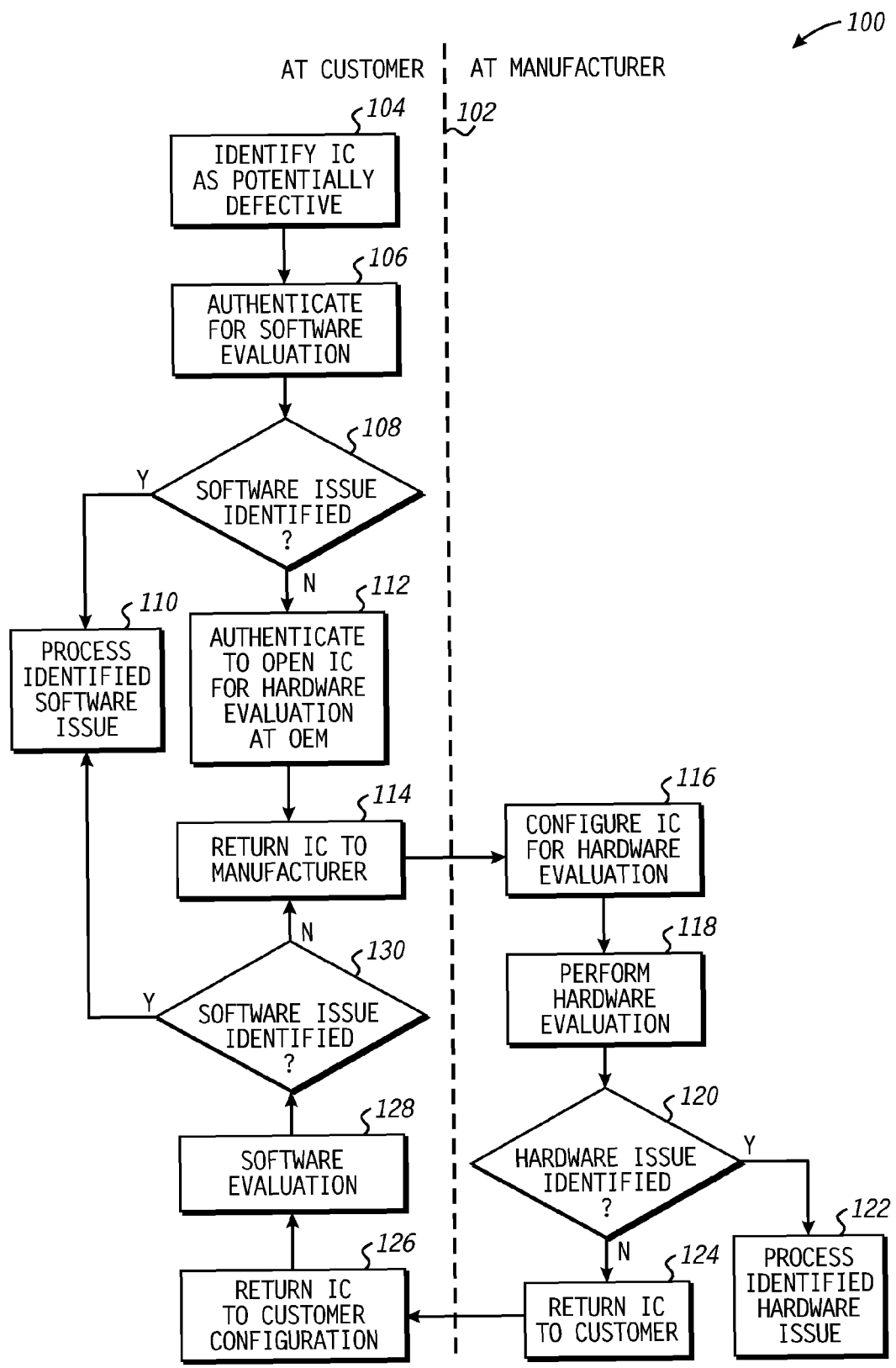
FIG. 1 is flow diagram illustrating a process for evaluating a potentially defective secured integrated circuit (IC) device in accordance with at least one embodiment of the present disclosure.

FIGS. 1-5 illustrate example techniques for enabling hardware evaluation of an integrated circuit (IC) device previously secured by a customer. In one embodiment, a customer configures an IC device with sensitive information, such as a key or a serial number, and then configures the IC device to disable access to the debug interface of the IC device. Access to the debug interface can be prevented by, for example, blowing a fuse in the IC device so as to configure the debug interface to enter a secure and inaccessible state. Should the customer determine that the IC device is not operating as expected or desired, the customer can temporarily gain access to the IC device for software evaluation purposes through a challenge/response process that authenticates the customer to the IC device. This temporary access further can provide the customer access to a fuse that, when blown, permanently configures the IC device so as to allow open access to the debug interface of the IC device. Thus, should the software evaluation fail to identify the problem, the customer can blow this fuse to permanently enable open access to the debug interface IC device and then provide the IC device to the manufacturer for further evaluation. As the manufacturer receives the IC device in a state whereby access to the debug interface is enabled without authentication, the manufacturer can perform one or more hardware evaluation processes of the IC devices through the opened debug interface without requiring authentication (and thus without requiring sensitive information from the customer). Further, in at least one embodiment, blowing the fuse to permanently enable open access to the debug interface in the IC device also configures the IC device so as to use a default configuration in place of the customer configuration of the IC, thereby placing the IC device in a "clean" configuration conducive to hardware evaluation. If the IC device is returned to the customer, the IC device can be reconfigured to use the customer configuration by, for example, asserting a particular pin of the IC device or by submitting a particular command to the IC device via the debug interface during the boot process of the IC device.

The term "open access", as used herein with reference to a debug interface, refers to the debug interface being externally accessible for debugging/evaluation purposes without requiring authentication. The term "challenge/response process", as used herein, refers to an authentication process whereby the IC device generates a challenge value and an external device seeking access responds with a response value which is then used by the IC device to authenticate the external device. In embodiments described below, the challenge value can be encrypted or otherwise signed by the external device to generate the response value and then the response value verified by the IC device based on the original challenge value. Alternately, the challenge value can be encrypted by the IC device and then decrypted by the external device to generate the response value, which is then verified by the IC device based on the original challenge value. The challenge/response process can be performed using, for example, a secure code-signing server and test bench via the debug interface port of the IC device. Alternately, the challenge/response process can be performed via a JTAG tester using secure boot/image authentication infrastructure for testing the IC device.

For ease of description, the example techniques are described in the context of a manufacturer-customer relationship, whereby the term "customer" refers to the entity (or its agent or affiliate) that configures an IC device to include sensitive information and the term "manufacturer" refers to the entity that provides the IC device to the customer. To illustrate, when the IC device is implemented in, for example, a cellular phone, the manufacturer could include, for example, the original equipment manufacturer (OEM) that manufactured the IC device and the customer could include, for example, the cellular phone manufacturer who implements the IC device in a cellular phone and then configures the IC device of the cellular phone with sensitive information. The example techniques are not limited to the context of a manufacturer-customer relationship. Rather, these techniques can be employed in any relationship whereby one entity configures the IC device with sensitive information and another entity is be tasked with hardware evaluation of the IC device should an issue arise in the operation of the IC device. Further, the example techniques generally are described in the example context of using a random number as the challenge value. However, other values, such as another value tied to the state of the IC, can be used as the challenge value.

FIG. 1 illustrates an example method 100 for evaluating a potentially defective IC device in accordance with at least one embodiment of the present disclosure. For the following, it is assumed that the IC device is supplied from a manufacturer to a customer for configuration for use in association with an electronic device, such as a cellular phone, an automobile, a consumer electronic device, and the like. As part of this configuration, the customer stores sensitive information, such as one or more keys or a serial number, in one or more secure storage components of the IC device. As the IC device contains sensitive information, the customer typically desires to disable the debug interface of the IC device unless software evaluation or hardware evaluation of the IC device is subsequently desired. For FIG. 1, blocks representing corresponding processes performed at the direction of the customer are positioned to the left of a dividing line 102, whereas blocks representing corresponding processes performed at the direction of the manufacturer are positioned to the right of the dividing line 102.

At block 104, the customer identifies an IC device as potentially defective. This determination could result from, for example, a user reporting erroneous operation of an electronic device in which the IC device is implemented, or by testing by the customer of the IC chip before its implementation in the electronic device. As the IC device is suspected of being defective, the customer typically would perform software evaluation (i.e., software debugging) of the IC device to determine whether software implemented in association with the IC device is a cause of the problem.

At the point that the IC device is identified as potentially defective, the IC device is secured from access to its debug interface. Accordingly, to gain access to the IC device for software debugging purposes, at block 106 the customer installs the IC device in a test bench and conducts a challenge/response process with the IC device to authenticate the customer to the IC device so as to open the debug interface of the IC device for software debugging purposes. As described in greater detail below with reference to FIG. 4, the challenge/response process comprises the generation of a challenge value at the IC device, which is then output to a code signing server via the debug interface. The code signing server then generates a response value based on the challenge value and provides the response value to the IC device via the debug interface. In one embodiment, the response value can be bound to a unique identifier associated with the IC device, such as a MAC address, a serial number, or an International Mobile Equipment Identifier (IMEI). The IC device then uses the response value and the challenge value to verify or otherwise authenticate the customer. If the IC device successfully confirms authentication of the customer, the IC device opens the debug interface for software evaluation at block 108. In an alternate embodiment, the challenge/response process is performed using another interface of the IC device, such as via a JTAG tester. Further, rather than using a code signing server for authentication purposes, the authentication process instead can be conducted by reusing the secure boot or image authentication infrastructure of the test bench.

In the event that the customer is able to identify a software issue from the software evaluation, at block 110 the customer processes the identified software issue. In the event that the software issue resulted from a corruption of the software code as implemented at the IC device, the IC device can be reprogrammed with the original software code. Otherwise, if the identified software issue resulted from a flaw in the programming of the software itself, the processing at block 110 can include, for example, reprogramming of the software to address the identified software issue.

In the event that no software issue is identified, or in the event that the customer concludes that the IC device may have a hardware defect, the customer may decide to return the IC device to the manufacturer for hardware evaluation. In order to do so, the manufacturer will need access to the debug interface of the IC device. However, the manufacturer typically will not have access to the information needed to temporarily open the debug interface via a challenge/response process, as this information typically is held in strict confidence by the customer so as to maintain the security of the sensitive information stored at the IC device. Accordingly, the customer will need to permanently open the debug interface of the IC device so that the manufacturer can evaluate the hardware of the IC device without authentication. To permanently open the debug interface, at block 112 the customer is authenticated to the IC device using the challenge/response process described herein and, once authenticated, the customer configures the IC device to permanently enable open access to the debug interface. In at least one embodiment, a fuse (hereinafter, the "permanent debug fuse") of the IC device is blown by the customer so as to permanently configure the IC device to subsequently enable open access to the debug interface without requiring authentication. Other techniques of permanently configuring the IC device to permit open access to the debug interface can be implemented, such as, for example, by writing a particular value to a non-volatile memory location that permanently places the IC device in an open, or non-secure, state.

The particular customer-specific configuration of the IC device employed by the customer may inhibit effective hardware evaluation of the IC device by the manufacturer. Further, as described above, the customer configuration of the IC device may be based on sensitive information that the customer would prefer not be accessible to the manufacturer. Accordingly, in one embodiment, the process of configuring the IC device to permanently open access to the debug interface also includes permanently configuring the IC device to use a default configuration that is independent of the particular customer configuration. To illustrate, the IC device can implement a bank of set/reset flops, the outputs of which serve as control values for the default configuration. When the IC device is configured for permanent open access to the debug interface, a multiplexer controlled via the state of the permanent debug fuse or other fuse can select the outputs of the bank of set/reset flops for configuration control in place of the customer-configured values (set via, e.g., a bank of fuses selectively blown by the customer).

After permanently configuring the IC device to permit open access to the debug interface without requiring authentication, at block 114 the IC device is returned to the manufacturer for hardware evaluation. Upon receipt of the IC device, the manufacturer configures the IC device for hardware evaluation at block 116. This configuration can include, for example, setting the IC device to a default configuration appropriate for hardware evaluation. Alternately, as described above, the IC device may have already been configured to this default configuration as part of the process of permanently opening the debug interface of the IC device by the customer.

At block 118, the manufacturer uses the opened debug interface of the IC device to perform one or more hardware evaluation processes on the IC device, such as, for example, running one or more scan patterns to detect silicon defects in the digital logic of the IC device. At block 120 the results of the hardware evaluation are used to determine whether there is a hardware issue. In the event that a hardware issue is identified, at block 122 the manufacturer processes the identified hardware issue. This processing can include, compiling the results for subsequent statistical analysis, initiating a revision to the hardware design to correct the identified hardware issue, and the like. Otherwise, should no hardware issue be identified, or should the manufacturer otherwise determine that further analysis by the customer be desirable, the manufacturer provides the IC device back to the customer at block 124.

As noted above, the customer's configuration of the IC device to permanently open access to the debug interface of the IC device also can result in the configuration of the IC device to use a default configuration suitable for hardware evaluation and which is independent of the customer configuration. However, this default configuration may not be suitable for software debugging of the IC device by the customer after it is returned from the manufacturer. Accordingly, at block 126 the customer reconfigures the IC device to utilize the previously-programmed customer configuration so that the customer can perform one or more software debug processes while the IC device is configured according to the previous customer specifications. As described in greater detail below, the IC device can be configured to temporarily revert back to the customer configuration from the default configuration responsive to the assertion of a particular pin of the IC device during, for example, a boot sequence of the IC device in preparation for software debugging. Alternately, a command submitted to the IC device via the debug interface can be used to direct the IC device to use the previous customer configuration in place of the default configuration.

Once reverted to the previous customer configuration, at block 128 the customer initiates another iteration of software evaluation of the IC device. As the IC device has been configured to permanently open access to the debug interface, it may not be necessary for the customer to perform the challenge/response process for authentication to access the debug interface. However, certain software debug functions may remain secured independent of the access state of the debug interface and thus the customer may be required to conduct the authentication process for these debug functions before initiating the software evaluation. If the results of the software evaluation identify a software issue at block 130, the identified software issue is processed at a second iteration of block 110 as described above. Otherwise, if no software issues are identified at block 130 or if further hardware evaluation is warranted, at block 114 the IC device can be returned to the manufacturer for another round of hardware evaluation. The process of exchanging the IC device between the customer for software evaluation and the manufacturer for hardware evaluation can continue as necessary until the issue is resolved.

Figure 2:
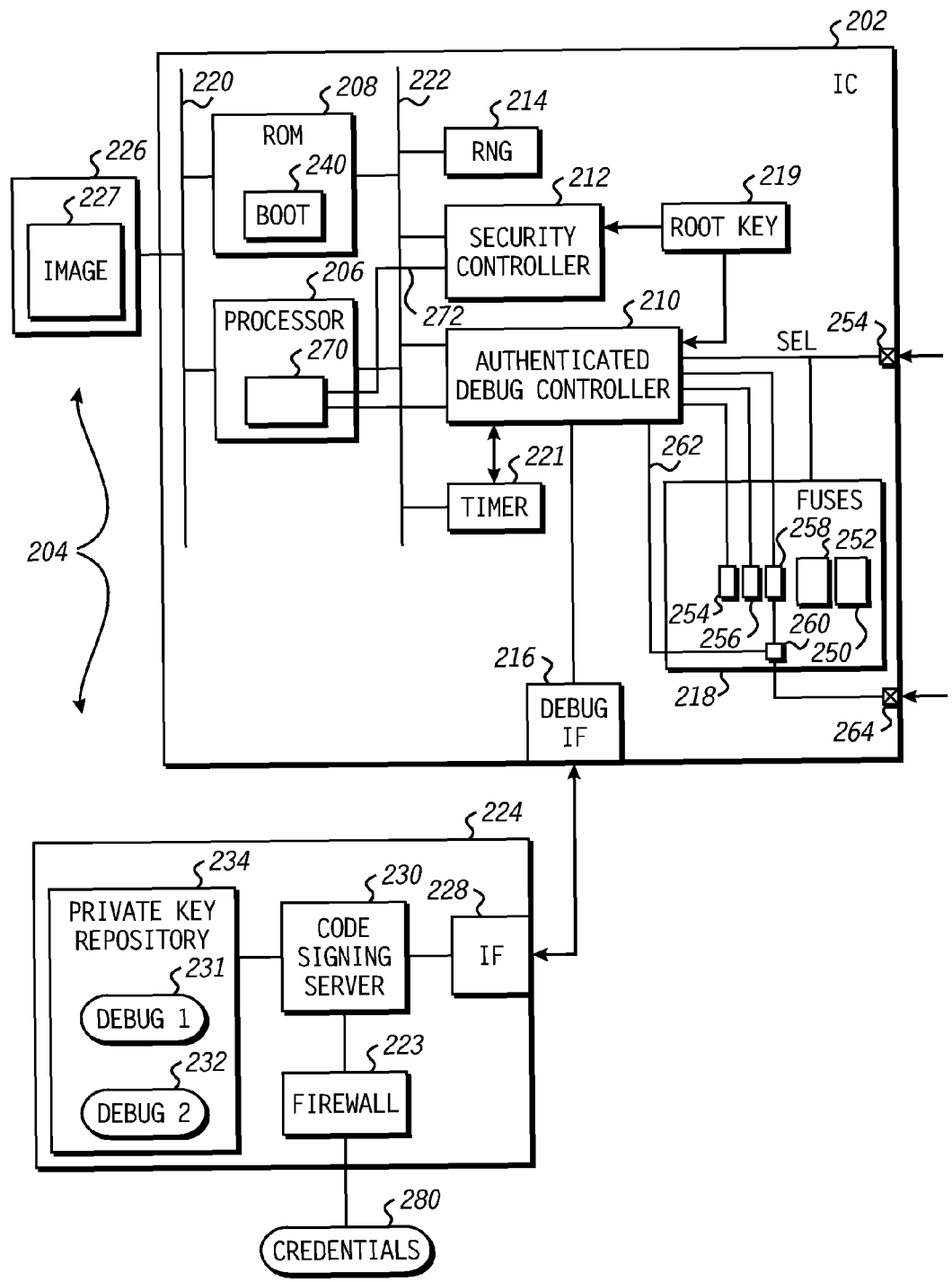
FIG. 2 is a block diagram illustrating an example IC device and a test bench for evaluating the IC device in accordance with at least one embodiment of the present disclosure.

FIG. 2 illustrates an example IC device 202 identified as potentially defective and an external device (test bench 204) employed by a customer to access the IC device 202 for evaluation purposes in accordance with the method 100 of FIG. 1. In the depicted example, the example IC device 202 includes one or more processors 206, a read only memory (ROM) 208, an authenticated debug controller 210, a security controller 212, a random number generator (RNG) 214, a debug interface 216, a configuration block 218, and a secure storage element (e.g., a register file, flash memory, etc.) to store one or more root key values 219 specific or unique to the customer. The secure storage element that stores the root key value 219 can include, for example, device-bound storage that is one-time-programmable (OTP), such as a fuse array or read only memory (ROM), thereby preventing the secure storage element from being swapped out of the IC device 202. The IC device 202 further can include one or more timers 221 (e.g., a countdown timer) that can be utilized to time-out certain features or sessions as described below. The components of the IC device 202 can be connected via one or more busses or other interconnects, such as, for example via a system bus 220 and a peripheral bus 222. The test bench 204 includes a debug device 224 and an external memory 226. The debug device 224 includes an IC interface 228, a code signing server 230, a firewall 233, and a private key repository 234. The external memory 226 is configured to store an image 227 representative of the operating system or software functionality implemented by the IC device 202 in its intended implementation within a system.

The RNG 214 is configured to generate a random number responsive to signaling provided from the processor 206. The random number can include a true random number or a pseudo-random number. As described below, the random number serves as a challenge value for a challenge/response processes utilized by the IC device 202 to authenticate a customer attempting to gain access to the IC device 202. In an alternate embodiment, the challenge value can comprise a value other than a random number, such as a value tied to the particular state of the IC device 202.

The debug interface 216 can include any of a variety of interfaces utilized for external access to the IC device 202 for debugging or evaluation purposes. Examples of the debug interface 216 include, but are not limited to, a Joint Test Action Group (JTAG) (IEEE 1149. 1) interface, a Universal Serial Bus (USB) interface, a FireWire interface, an Inter-Integrated Circuit (I2C) interface, a Background Debug Mode (BDM) serial interface, and the like. For ease of reference, the debug interface 216 is discussed herein in an example context of a JTAG interface.

The configuration block 218 is utilized to provide configuration information for the IC device 202. In one embodiment, the configuration block 218 includes a customer fuse bank 250 comprising one or more fuses that can be selectively blown by the customer so as to implement a particular customer configuration for the IC device 202. Example customer configurations can include, for example, enabling or disabling security functions, enabling or disabling specific manufacturer or device identifiers (e.g., an International Mobile Equipment Identity (IMIE) value), and the like, setting a particular bus control pattern and width, etc. The configuration block 218 further can include a default configuration component 252 used to implement a default configuration for the IC device 202 during hardware evaluation of the IC device 202. The default configuration can include, for example, setting the IC device to an engineering mode whereby manufacturing identifiers are set to a default value (e.g., zero) and setting the IC device 202 to boot from a specified external memory device supported by the test bed rather than from an internal secure boot program. The default configuration component 252, in one embodiment, can include a fuse bank configurable by the manufacturer so as to implement a particular default configuration. Alternately, the default configuration component 252 can include a group of set/reset flops configured to provide the default configuration. The authenticated debug controller 210 provides a signal SEL to control one or more multiplexers (not shown) to select between the customer fuse bank 250 or the default configuration component 252 so as to configure the IC device 202 to use either the customer configuration or the default configuration, respectively. Further, as described below, the signal SEL or a similar signal can be provided by the customer via, e.g., assertion of an external pin 255 of the IC device 202 so as to direct the IC device 202 to implement the customer configuration represented by the customer fuse bank 250. The customer configuration can include, for example, setting the IC device 202 into a production mode whereby internal controls of the chip are disabled, the manufacturer identifiers are set to specific values, setting the IC device 202 to default to the internal secure boot, and setting the IC device 202 to interface with a specific external memory device that ships with the product in which the IC device 202 is intended for implementation.

The configuration block 218 further can include one or more fuses that can be selectively blown by the customer so as to control the debug access features of the IC device 202. These fuses can include, for example, a debug disable fuse 254, a challenge required fuse 256, and a permanent debug fuse 258. The debug disable fuse 254 controls whether the debug interface 216 is accessible in any situation. Thus, the customer can blow the debug disable fuse 254 should the customer desire to permanently and irrevocably close the debug interface 216. The challenge required fuse 256 controls whether the challenge/response process is required to authenticate the customer for software debugging access to the IC device 202. The permanent debug fuse 258 controls whether the IC device 202 is configured to permanently enable open access to the debug interface 216 without requiring authentication. Thus, as described herein, the customer can blow the permanent debug fuse 258 on a potentially defective IC device 202 to configure the IC device 202 to permanently enable open access to the debug interface 216 by the manufacturer for hardware evaluation of the IC device 202.

As the permanent debug fuse 258 controls whether the debug interface 216 is permanently opened for access without authentication, the permanent debug fuse 258 is protected from being blown without proper authentication by the way of a fuse access mechanism 260. In one embodiment, the fuse access mechanism 260 includes a switch, a passgate, or other controller having a conductive state and non-conductive state that is selectively activated by the authenticated debug controller 210 via a control signal 262 so as to provide a conductive path from the permanent debug fuse 258 to an external pin 264 such that the customer can blow the permanent debug fuse 258 via the external pin 264 when the fuse access mechanism 260 is activated. In another embodiment, once the customer is authenticated, the customer can provide a particular command set (as a command file or other data structure) to the authenticated debug controller 210 via the debug interface 216 to direct the authenticated debug controller 210 to blow the permanent debug fuse 258 internally via the fuse access mechanism 260.

The authenticated debug controller 210 is configured to control the debug interface 216 and to control other components of the IC device 202 based on configuration information determined from the configuration block 218, based on commands and other data received via the debug interface 216, and based on control information provided from a boot program 240 stored in the ROM 208 and executed by the processor 206. In particular, the authenticated debug controller 210 conducts a challenge/response process to authenticate a customer desiring to gain access to the debug interface 216. The authenticated debug controller 210 also signals the security controller 212 to set the access level for the IC device 202. Further, the authenticated debug controller 210 decodes commands received via the debug interface 216 to facilitate software evaluation and hardware evaluation of components of the IC device, such as, for example, interfacing with one or more scan chains 270 of the processor 206 for hardware evaluation of the processor 206. A more detailed description of the authenticated debug controller 210 is provided below with reference to FIG. 3.

The security controller 212 is configured to enact a particular security level at the IC device 202 based on signaling received from the authenticated debug controller 210. To illustrate, the IC device 202 may be configured in one of four security levels: (1) Closed: the debug interface 216 is not available (either customer authentication has not taken place or has not been successful); (2) Non-Secure Session (the debug interface 216 is opened for use until the next power on reset occurs (user resets do not disrupt the session); (3) Permanent Debug Fuse Blowable: the customer is enabled to blow the permanent debug fuse; and (4) Secure State Session: the debug interface 216 is available without altering the security state. Other examples of security, or access, levels are described below. Further, the security controller 212 can control access to one or more components of the IC device 202 based on the security level such as by selectively asserting an enable signal 272 to enable access to the scan chain 270. Table 1 below illustrates how the authenticated debug module 210 can initially direct the security level implemented by the security controller 212 based on the states of the fuses 254, 256, and 258 of the configuration block 218:

TABLE 1

Achievable Security Levels From Fuse States

| Fuse Name | | | Achievable Security Level | | | |
| --- | --- | --- | --- | --- | --- | --- |
| Disable Debug | Permanent Debug | Challenge Required | Closed | Non-Secure Session | Permanent Debug Blowable | Secure State Session |
| 1 | X | X | Yes | No | No | No |
| 0 | 0 | 0 | Yes | Yes | Yes | No |
| 0 | 0 | 1 | Yes | Yes | Yes | Yes |
| 0 | 1 | 0 | No | Yes | Yes | No |
| 0 | 1 | 1 | No | Yes | Yes | Yes (if pin asserted) |

Turning to the test bench 204, the IC interface 228 includes any of a variety of interfaces compatible with the debug interface 216, including a JTAG interface, a USB interface, a FireWire interface, an I2C interface, and the like. The code signing server 230, in one embodiment, is configured to sign a command file and provide the signed command file to the IC device 202 for execution following the initial secure boot up, whereupon the command file includes a command to direct the IC device 202 to initiate the process of opening the debug interface 216 using the challenge/response process. The command file further can include one or more public keys for storage at the IC device 202 for use in the challenge/response process described below. In at least one embodiment, code signing server 230 signs the command file using a private key corresponding to the root key value 219 stored at the IC device 202. Accordingly, the IC device 202 can authenticate the source of the command file and thus authorize its execution and the storage of the associated public key information by verifying the signed command file using the root key value 219. In an alternate embodiment, rather than using the root key value 219 directly, the private keys can be verified using a chain of one or more certificates linking back to the root key value 219.

Upon authorization of the customer's agent based on the customer's agent's credentials 280 (e.g., user name and password), the code signing server 230 or other authentication server is configured to receive a challenge value from the IC device 202 via the interfaces 216 and 228 and sign the challenge value using a particular private key (e.g., one of private keys 231 or 232) obtained from the private key repository 234. The resulting signed value is provided to the IC device 202 as a response value as part of a challenge/response process for authentication as described in detail below.

As also described below, there may be different levels of authenticated access permitted by the IC device 202 and each access level may correspond to a particular public key/private key pair used in the challenge/response process. Thus, the credentials 280 provided by the customer's agent may be determinative of which private key is selected for use by the code signing server 230 and thus determinative of the particular access level permitted for the customer.

Figure 3:
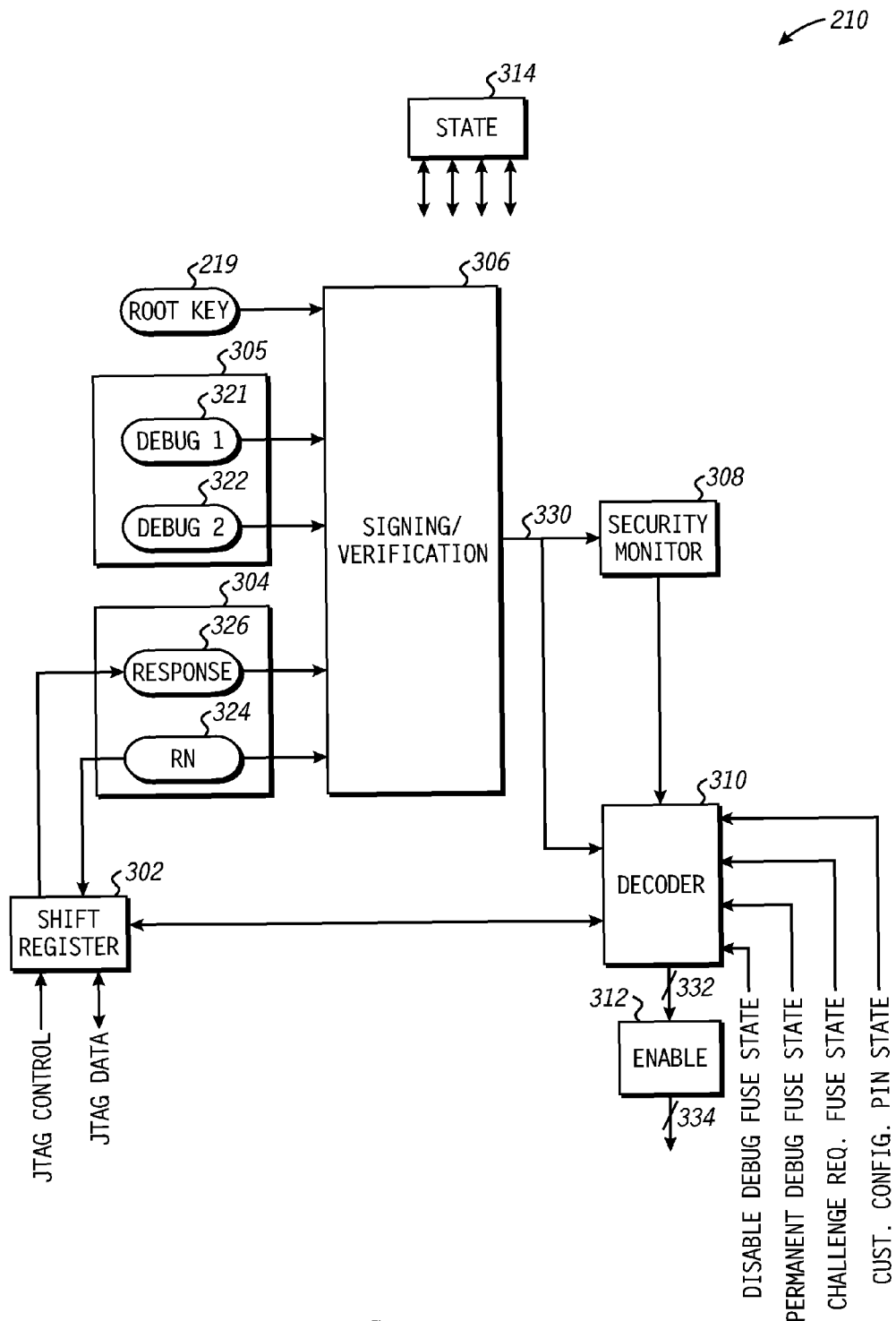
FIG. 3 is a block diagram illustrating an example authenticated debug controller of the IC device of FIG. 2 in accordance with at least one embodiment of the present disclosure.

FIG. 3 illustrates an example implementation of the authenticated debug controller 210 of FIG. 2 in accordance with at least one embodiment of the present disclosure. In the depicted example, the authenticated debug controller 210 includes a shift register 302 (alternately part of the debug interface 216), a secure random access memory (RAM) 304, a non-volatile storage component (e.g., flash memory or a one-time-programmable register file) 305, a signature authentication module 306, a security monitor 308, a decoder 310, an enable controller 312, and a state machine 314 to control the illustrated components. The shift register 302 is configured to shift data in from the debug interface 216 and to shift data out to the debug interface 216 based on, for example, JTAG control signaling. The RAM 304 is configured to store certain data, such as a challenge value 324 (e.g., a random number generated by the RNG 214 (FIG. 2)) for a challenge/response process, and a response value 326 received from the debug device 224. The non-volatile storage component 305 is configured to store a set of one or more public keys, such as public keys 321 (Debug1) and 322 (Debug 2). As discussed above, the public keys 321 and 322 can be provided with a signed command file via the debug interface 216 and stored in the non-volatile storage component 305 upon authentication using the signed command file. The signing authentication module 306 is configured to authenticate the entity attempting to gain access using one or both of the public keys 321 or 322, the response value 326, and the challenge value 324. If the response value 326 results in authentication, the signing authentication module 306 asserts an authenticated signal 330 for receipt by the security monitor 308 and the decoder 310 to signal confirmation of authentication of the customer. Further, in the event that there are multiple public keys, the authentication process can be repeated with each successive public key until a successful authentication occurs or until no public key remains untried. In this instance, signing authentication module 306 further can provide with the authenticated signal 330 an identifier of the public key that resulted in the successful authentication. In the event that no successful authentication occurs, the signing authentication module 306 does not assert the authenticated signal 330, thereby signaling to the security monitor 308 and the decoder 310 that the customer has failed to authenticate. Further, as noted above, security levels can be bound to particular public keys, and thus the signing authentication module 306 can signal which public key resulted in successful authentication so as to allow the security monitor 308 and the decoder 310 to set the appropriate security level.

The security monitor 308 and the boot program 240 (FIG. 2) cooperate during the boot sequence to help ensure that the IC device is booting normally. Further, based on the access level indicated by the authenticated signal 330 (as determined from the particular public key that generated the match), the security monitor 308 may force a non-secure state and prevent access to the private keys during non-secure conditions.

The decoder 310 is configured to provide a decode value 332 representative of a debug state or configuration to be enacted. The decoder 310 generates this decode value 332 responsive to the states of the debug-related fuses, including the blown/non-blown state of the disable debug fuse 254, the blown/non-blown state of the challenge required fuse 256, and the blown/non-blown state of the permanent debug fuse 258. Further, as describe herein, the customer can direct the IC device 202 to revert back to a customer configuration from a default configuration once the debug interface 216 is permanently opened by asserting the customer configuration pin 255 (FIG. 2). Thus, the decoder 310 also generates the decode value 332 responsive to the state of the customer configuration pin 255. Moreover, the decoder 310 can generate the decode value 332 to implement the security level associated with the public key that resulted in successful authentication during the challenge/response process.

The enable controller 312 interprets the decode value 332 and selectively configures one or more control signals 334 so as to implement the debug configuration represented by the decode value 332. These control signals 334 can include control signaling used to open access to the debug interface 216, control signaling to open access to hardware evaluation components (e.g., scan chains), control signaling to control access to the permanent debug fuse 258 (as well as enable signaling to internally blow the permanent debug fuse 258), control signaling to direct one of more multiplexers of the configuration block 218 to select between the customer configuration represented by the customer fuse bank 250 or the default configuration represented by the default configuration component 252 (e.g., another fuse bank or a group of set/reset flops), and the like.

Figure 4:
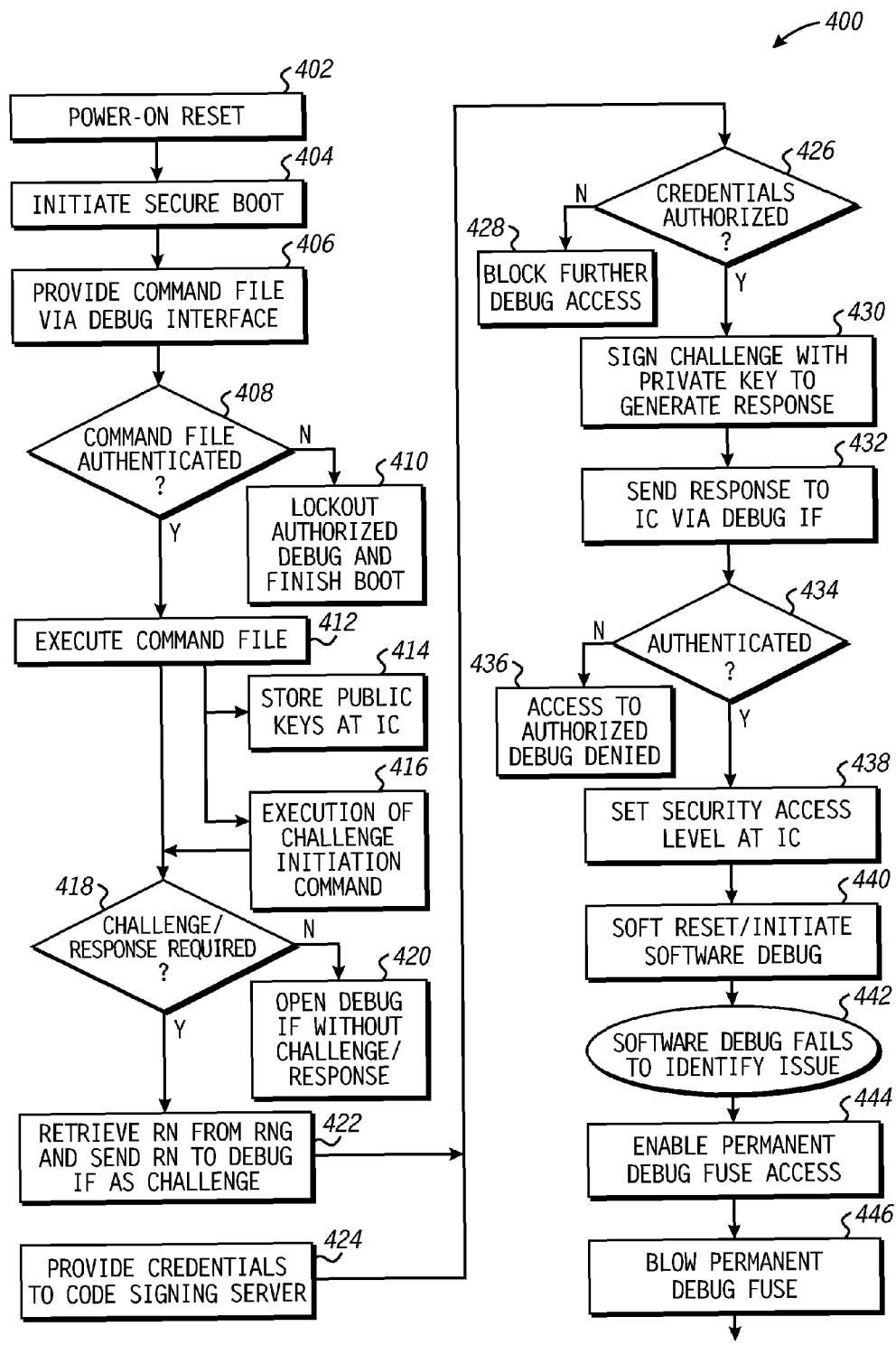
FIG. 4 is a flow diagram illustrating a method for enabling access to a debug interface of the IC device of FIG. 2 based on confirmation of authentication using a challenge/response process in accordance with at least one embodiment of the present disclosure.

FIG. 4 illustrates an example method 400 of evaluating the IC device 202 of FIG. 2 in accordance with at least one embodiment of the present disclosure. For the following, it is assumed that the disable debug fuse 254 remains in a non-blown state, thereby configuring the IC device 202 to permit debug access. At block 402, the customer, identifying the IC device 202 as potentially defective, connects the IC device 202 to the external memory 226 and the debug device 224 of the test bench 204 (FIG. 2) and then subjects to the IC device 202 to a power on reset (POR). At block 404 the IC device 202 loads the boot program 240 from the ROM 208 and initiates a secure boot sequence. While the IC device 202 is initializing, at block 406 the debug device 224 transmits a command file (or other data structure representative of executable instructions or command) to the IC device 202 via the debug interface 216. The command file, in one embodiment, includes one or more public keys to be used in a challenge/response process (e.g., public keys 321 and 322, FIG. 3). Further, the command file is signed by the debug device 224 using a private key corresponding to the root key value 219 of the IC device 202 so as to permit the IC device 202 to authenticate the command file.

At block 408, the IC device 202 uses the root key value 219 to authenticate or verify the signed command file. In the event that the authentication process is unsuccessful, at block 410 the IC device 202 locks out the authenticated debug components of the IC device 202 (e.g., by disconnecting power from the debug interface 216, the authenticated debug controller 210, etc.), finishes the secure boot in its normal order, and loads the image 227 (FIG. 2) from the external memory 226. Otherwise, if the authentication process is successful, at block 412 the authenticated debug controller 210 provides the command file to the processor 206 for execution. As noted above, the command file can include one or more public keys (public keys 321 and 322) and thus the command file can include a command that directs the processor 206 to store the one or more public keys in the non-volatile storage component 305 (FIG. 3) of the authenticated debug controller 210 at block 416. Alternately, the authenticated debug controller 210 can store the one or more public keys included with the command file in response to authentication of the signed command file. Further, in one embodiment, the command file can include a command that directs the processor 206 to signal the authenticated debug controller 210 to initiate the challenge/response process. Alternately, the customer provides this initiation signal by asserting a particular pin of the IC device 202 during the boot process.

In response to signaling from the processor 206 or by another mechanism such as via an external pin of the IC device 202, at block 418 the IC device 202 determines the state of the challenge required fuse 256 to determine whether the customer has configured the IC device 202 to require the challenge/response process to open the debug interface 216. If the state of the challenge required fuse 256 indicates the challenge/response process is not required, at block 420 the IC device 202 permanently opens the debug interface 216 without first authenticating the customer via the challenge/response process.

Otherwise, if the state of the challenge required fuse 256 indicates the challenge/response process is required, the IC device 202 initiates a challenge/response process to authenticate the customer for access. In at least one embodiment, the challenge/response process utilized by the IC device 202 and the debug device 224 implements signing based on paired keys (e.g., a Public Key Infrastructure (PKI) key pair). In particular, the challenge/response process can be implemented substantially in accordance with the unilateral authentication protocol described in the U.S. Department of Commerce Federal Information Processing Standards (FIPS) Publication 196 (entitled "Entity Authentication Using Public Key Cryptography"). Accordingly, at block 422 the boot program 240 signals the RNG 214 to generate a random number (RN) and provide the random number to the authenticated debug controller 210. The authenticated debug controller 210 stores the random number in the RAM 304 (FIG. 3) and provides the random number to the debug device 216 for transmission to the debug device 224 as a challenge value. Separately, at block 424 the customer's agent provides the customer's agent's credentials 280 to the firewall 233 to verify the customer's agent's identity and access level. At block 426 the firewall 233 determines whether the customer's agent is authorized to access the IC device 202 based on the credentials 280, and if so, at what access level. In the event that the credentials 280 are insufficient for authorization, at block 428 the debug interface 224 blocks any further attempts by the customer to access the IC device 202 via the debug interface 228 until the IC device 202 is reset again.

Otherwise, if the customer's agent is authorized, at block 430 the code signing server 230 selects a private key from the private key repository 234 according to the access level associated with the customer's credentials 280 and then signs the challenge value with the selected private key to generate a response value. To illustrate, the IC device 202 may have two access levels: a lower access level associated with a private key Debug1 and a higher access level associated with a private key Debug2. If the credentials 280 permit access to the higher access level, the code signing server 230 selects the private key Debug2 for use in the challenge/response process. Otherwise, if only the lower access level is permitted for the customer, the code signing server 230 selects the private key Debug1. Having signed the challenge value with a private key to generate a response value, at block 432 the code signing server 230 provides the response value to the IC device 202 via the debug interface 216. The authenticated debug controller 210 receives the response value from the debug interface 216 and stores the response value in the RAM 304 (FIG. 3).

At block 434, the signature authentication module 306 attempts to authenticate or verify the response value using the original random number stored in the RAM 304 (FIG. 3) at block 422 and using a public key accessed from the non-volatile storage component 305 (FIG. 3). In the event the authentication is unsuccessful, the signature authentication module 306 signals that the customer has failed to authenticate. However, as discussed above, the IC device 202 may have multiple access levels, each with its own corresponding public key-private key pair. Thus, the signature authentication module 306 may repeat the authentication process of block 434 for each stored public key to determine which, if any, of the public keys results in a successful authentication. The access level associated with the particular public key that results in a successful authentication then is used to set the access level of the IC device 202 as described below.

In the event that none of the stored public keys result in a successful authentication, at block 436 the authenticated debug controller 210 denies the customer access to the authenticated debug components of the IC 202. Further, in one embodiment, the boot program 240 initiates a reset responsive to the failure to authenticate the customer.

In the event that authentication of the customer is confirmed by the challenge/response process, at block 438 authenticated debug controller 210 and the security controller 212 set the access level at the IC device 202 based on, for example, the access level associated with the public key that resulted in the successful authentication. Example access levels can include: (1) enable/disable access to provisioned secret information of the IC device 202, such as content or software keys; (2) enable tracing ports that permit software to utilize tracing code to output measurement data via a port of the IC device 202; (3) partially opening the debug interface to one or more debug domains of the IC device 202, whereby each debug domain is associated with a corresponding set of one or more scan chains and thus has a different security risk; and (4) a clock rate limiter mode whereby a clock rate can be lowered or limited to a maximum rate so as to facilitate debugging. Further, the authenticated debug controller 210 temporarily opens the debug interface 216, and further temporarily opens access to the permanent debug fuse 258.

In at least one embodiment, the temporary opening of the debug interface 216 and the access to the permanent debug fuse 258 is ended by a power-on-reset or "hard" reset, but is persistent between user resets or "soft" resets. Accordingly, at block 440 the customer performs a soft reset of the IC device 202. During the resulting boot process, the boot program 240 (FIG. 2) directs the processor 206 to load the operating system/software functions represented by the image 227 from the external memory 226 (FIG. 2) so as to permit software debugging using the operating system/software functionality used in the product in which the IC device 202 is implemented. Thus configured, at block 442 the customer performs one or more software evaluation processes with the IC device 202 via the temporarily opened debug interface 216 in an attempt to identify a software issue that is causing the IC device 202 to operate abnormally. Further, because the temporary access to the debug interface 116 can persist across soft resets, the customer can configure the IC device 202 for temporary access to the debug interface 116 and then institute a soft reset to allow the customer to monitor an entire "normal" boot sequence via the debug interface 116.

So as to more fully secure the IC devices 202 while the debug interface 116 is temporarily opened, a periodic re-authentication process can be implemented whereby the authenticated debug controller 210 can initiate the timer 221 (e.g., initially in response to a soft reset) such that when the timer 221 times out, the authenticated debug controller 210 deauthorizes the customer and reinitiates the challenge/response process to reauthorize the customer. The timer 221 can continue to be periodically reset so as to ensure that the customer periodically re-authenticates during a period between hard resets.

Further, in addition to using a timer 221 for periodic reauthentication, access to certain security levels can trigger the authenticated debug controller 210 or the security controller 212 to automatically start revocation timers with time-out values set in, for example, device-bound fuses in the IC device 202. As such, when the revocation timer for a security level times out, the user (customer or manufacturer) is required to reauthenticate to regain access to the security level.

For the following, it is assumed that the software evaluation process performed at block 442 fails to identify a software issue and thus hardware evaluation of the IC device 202 by the manufacturer becomes necessary. However, at this point the debug interface 216 is open only until a power-on-reset occurs, at which point the IC device 202 will revert back to a secure state. Thus, unless the customer is willing to share the private keys necessary to authenticate access to the debug interface 216 with the manufacturer, the customer will need to configure the IC device 202 to permanently open access to the debug interface 216 so that the debug interface 216 can be used by the manufacturer for hardware evaluation. As described above, in one embodiment the IC device 202 utilizes the permanent debug fuse 258 that, when blown, configures the authenticated debug controller 210 to permit open access to the debug interface 216 without authentication. Accordingly, at block 444 the IC device 202 enables access to the permanent debug fuse 258 responsive to the authentication of the customer from the challenge/response process of blocks 410-428 and at block 446 the customer blows the permanent debug fuse 258 to configure the IC device 202 to permanently permit open access to the debug interface 216. In one embodiment, the permanent debug fuse 258 is blown from an external pin 264 (FIG. 2) via the fuse access mechanism 260. Thus the authenticated debug controller 210 can enable the customer to access and blow the permanent debug fuse 258 from the external pin 264 by asserting the control signal 262 so as to place the fuse access mechanism 260 in a conductive state. In another embodiment, the permanent debug fuse 258 is internally blown and the authenticated debug controller 210 is configured to blow the permanent debug fuse 258 in response to a command to blow the permanent debug fuse 258 received via the debug interface 216. After configuring the IC device 202 to permanently enable open access to the debug interface 216, the customer can disconnect the IC device from the debug device 224 and return the IC device 202 to the manufacturer for hardware evaluation as described above.

Figure 5:
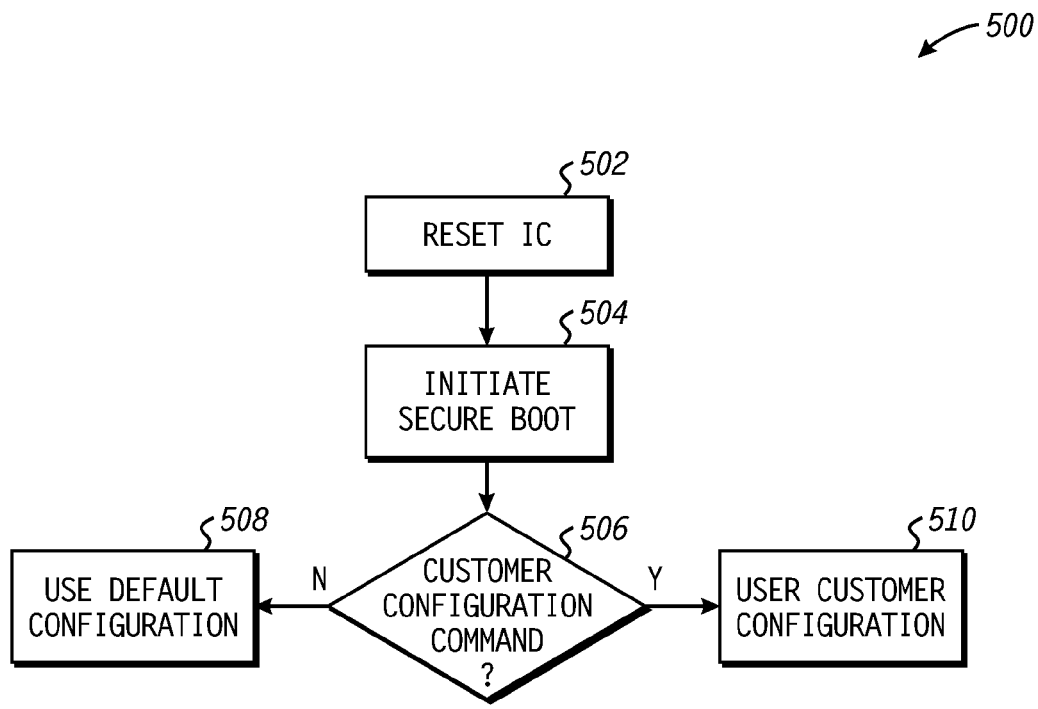
FIG. 5 is a flow diagram illustrating a method for restoring a customer configuration at the IC device of FIG. 2 subsequent to permanently enabling open access to the debug interface in accordance with at least one embodiment of the present disclosure.

FIG. 5 illustrates an example method 500 for returning the IC device 202 to a customer configuration for further evaluation in accordance with at least one embodiment of the present disclosure. In one embodiment, the process of configuring the IC device 202 to permanently permit open access to the debug interface 216 (e.g., by blowing the permanent debug fuse 258) also configures the IC device 202 to utilize a default configuration suitable for hardware evaluation (represented by the default configuration component 252) in place of the customer's configuration (represented by the customer fuse bank 250). However, in the event that the customer subsequently returns the IC device 202 back to the customer for further evaluation by the customer, the customer may find it advantageous to return the IC device 202 back to the customer configuration. Method 500 illustrates an example process for this reconfiguration process.

At block 502, the IC device 202 is received by the customer and reconnected to the test bench 204 (FIG. 2) for evaluation purposes. The customer then initiates a reset of the IC device. At block 504 the IC device 202 begins the secure boot process. During this process, the IC device 202 determines whether the customer has signaled an intent to use the customer configuration in place of the default configuration. The customer can signal this intent by, for example, asserting the customer configuration pin 255, by providing a particular command via the debug interface 216, and the like.

In the event that the customer has not signaled an intent to use the customer configuration, at block 508 the authenticated debug module 210 configures the signal SEL (FIG. 2) to direct one or more multiplexers to select the default configuration information from the default configuration component 252 and the IC device 202 operates using this default configuration information. Otherwise, in the event that the customer has signaled an intent to use the customer configuration, at block 510 the authenticated debug module 210 configures the signal SEL to direct the one or more multiplexers to select the customer configuration information from the customer fuse bank 250.

The preceding description assumes that no authentication of the customer is necessary to reconfigure the IC device 202 to use the customer configuration information in place of the default configuration information. However, as the customer configuration information can include sensitive information, the method 500 further can include an authentication requirement before the customer is permitted to direct the IC device 202 to use the customer configuration information by asserting the customer configuration pin 255 or providing a particular command via the debut interface 216.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
   conducting a challenge/response process using a first key value stored in an integrated circuit (IC) device and a challenge value generated at the IC device;
   temporarily enabling configuration of the IC device to permanently enable open access to a debug interface of the IC device responsive to confirmation of authentication from the challenge/response process;
   temporarily enabling access to the debug interface responsive to confirmation of authentication from the challenge/response process;
   performing software evaluation of the IC device while access to the debug interface is temporarily enabled; and
   configuring the IC device to permanently enable open access to the debug interface responsive to a failure to identify a defect in the IC device from the software evaluation.

2. The method of claim 1, further comprising:
   performing hardware evaluation of the IC device via the debug interface subsequent to configuring the IC device to permanently enable open access to the debug interface.

3. The method of claim 1, wherein:
   the IC device comprises a default configuration component representative of a default configuration and a customer fuse bank representative of a customer configuration; and
   configuring the IC device to permanently enable open access to the debug interface further comprises configuring the IC device to operate using the default configuration represented by the default configuration component in place of the customer configuration represented by the customer fuse bank.

4. The method of claim 3, further comprising:
   receiving, at the IC device, an input directing the IC device to operate using the customer configuration represented by the customer fuse bank; and
   configuring the IC device to operate using the customer configuration responsive to receiving the input.

5. The method of claim 1, wherein:
   the IC device is configured to permanently enable open access to the debug interface by placing a fuse in a blown state; and
   temporarily enabling configuration of the IC device to permanently enable open access to the debug interface comprises enabling access to the fuse responsive to confirmation of authentication from the challenge/response process.

6. The method of claim 5, further comprising:
   configuring the IC device to permanently enable open access to the debug interface by blowing the fuse while access to the fuse is enabled.

7. The method of claim 1, wherein conducting the challenge/response process comprises:
   generating the challenge value at the IC device;
   providing the challenge value to an external device via the debug interface of the IC device;
   receiving a response value from the external device via the debug interface; and
   confirming authentication using the challenge value and the first key value.

8. The method of claim 7, further comprising:
   signing, at the external device, the challenge value using a second key value to generate the response value, wherein the first key value comprises a public key of a public key infrastructure (PKI) key pair and the second key value comprises a private key of the PKI key pair.

9. The method of claim 1, further comprising:
   receiving, via the debug interface, a signed command file from an external device, the first key value accompanying the signed command file;
   storing the first key value at the IC device responsive to confirming authentication of the signed command file using a root key value of the IC device;
   conducting a challenge/response process using the first key value stored in the IC device and a challenge value generated at the IC device; and
   wherein temporarily enabling configuration of the IC device to permanently enable open access to a debug interface of the IC device responsive to confirmation of authentication from the challenge/response process.

10. A method comprising:
    under direction of a first party:
       temporarily enabling access to a debug interface of an integrated circuit (IC) device via authentication of the first party by a challenge/response process using a first key of the IC device and a challenge value generated at the IC device;
       conducting a software evaluation of the IC device via the debug interface;
       permanently enabling open access to the debug interface while authenticated in response to failing to identify an issue with the IC device from the software evaluation; and
       providing the IC device to a second party.

11. The method of claim 10, further comprising:
    under direction of the second party:
       conducting a hardware evaluation of the IC device via the debug interface.

12. The method of claim 11, wherein permanently enabling open access to the debug interface of the IC device comprises configuring the IC device to operate using a first configuration represented by a default configuration component in place of a second configuration represented by a fuse bank configured by the first party, and the method further comprising:
    under the direction of the second party:
       returning the IC device to the first party in response to failing to detect an issue with the IC device via the hardware evaluation; and
    under the direction of the first party:
       providing a signal to the IC device to direct the IC device to operate using the second configuration represented by the fuse bank; and
       configuring the IC device to operate using the second configuration in response to the signal.

13. An integrated circuit (IC) device comprising:
    a storage component to store a key value;
    a debug interface;
    a first fuse operable to control access to the debug interface;
    an authenticated debug controller configured to:
       conduct a challenge/response process using the key value and a challenge value; and
       temporarily enable configuration of the IC device to permanently enable open access to the debug interface by temporarily enabling access to the first fuse in response to confirmation of authentication from the challenge/response process;
    a default configuration component representing a first configuration state;
    a fuse bank representing a second configuration state; and
    wherein the IC device is configured to:

operate using a first configuration state represented by a default configuration component responsive to the first fuse having a non-blown state; and operate using a second configuration state represented by the fuse bank responsive to the first fuse having a blown state; and wherein the authenticated debug controller is to configure the IC device to operate using the first configuration state in place of the second configuration state responsive to receipt of a signal at a pin of the IC device.

14. The IC device of claim 13, wherein the authenticated debug controller is configured to conduct the challenge/response process by:

providing the challenge value to an external device via the debug interface;

receiving a response value from the external device via the debug interface; and confirming authorization using the challenge value and the response value.

15. The IC device of claim 14, wherein the authenticated debug controller further is configured to set an access level of the IC device based on an access level associated with the key value and responsive to confirmation of authentication.

16. The IC device of claim 13, further comprising:

a second fuse; and wherein the authenticated debug controller is further configured to:

conduct the challenge/response process responsive to the second fuse having a first state; and enable open access to the debug interface without conducting the challenge/response process responsive to the second fuse having a second state.

* * * * *